US012706654B2

(12) United States Patent
Chenumolu et al.

(10) Patent No.: US 12,706,654 B2
(45) Date of Patent: Aug. 11, 2026

(54) MIMO CELLULAR ANTENNA ARRAY CONFIGURATION FOR HIGH RESILIENCY AND POWER SAVINGS

(71) Applicant: DISH Wireless L.L.C., Littleton, CO (US)

(72) Inventors: Siddhartha Chenumolu, Ashburn, VA (US); Mehdi Alasti, Arlington, VA (US)

(73) Assignee: DISH Wireless L.L.C., Littleton, CO (US)

( * ) Notice: Subject to any disclaimer, the term of this patent is extended or adjusted under 35 U.S.C. 154(b) by 10 days.

(21) Appl. No.: 18/665,290

(22) Filed: May 15, 2024

(65) Prior Publication Data

US 2025/0357988 A1 Nov. 20, 2025

(51) Int. Cl.
*H04L 1/02* (2006.01)
*H04B 7/06* (2006.01)
*H04W 24/02* (2009.01)

(52) U.S. Cl.
CPC ............ *H04B 7/063* (2013.01); *H04W 24/02* (2013.01)

(58) Field of Classification Search
CPC ...... H04B 1/3838; H04B 1/18; H04B 7/0695; H04B 7/0617; H04B 1/126; H04W 52/0206; H04W 72/542; H04W 24/02; H04L 45/02
USPC ................................ 375/267, 260, 262, 299
See application file for complete search history.

(56) References Cited

U.S. PATENT DOCUMENTS 10,498,425 B2 * 12/2019 Kutz ...................... H04B 7/043
2019/0239233 A1 * 8/2019 Ryu ..................... H04B 7/0695
2020/0328509 A1 * 10/2020 Shiao ....................... H01Q 3/26
2021/0351991 A1 * 11/2021 Alam .................. H04L 43/0876
2023/0179508 A1 * 6/2023 Ostrowski ............ B60R 21/015 701/36
2024/0107443 A1 * 3/2024 Singh ....................... H04B 7/08

* cited by examiner

*Primary Examiner* — Khai Tran
(74) *Attorney, Agent, or Firm* — Kilpatrick Townsend & Stockton LLP

(57) ABSTRACT

Energy consumption of antennas within an antenna array used for multiple-input multiple output communications can be reduced through the use of an antenna optimization system. The antenna optimization system can determine a pattern of antennas to be used to reduce energy while maintaining required levels of cellular communication performance metrics. The antenna optimization system can take in multiple inputs, such as the number of connected devices, climate, time of day, total demand on network, and provide an output which can comprise an instruction set on which antennas should be activated and how they may be configured or used. The antenna optimization system may use a machine learning model.

20 Claims, 6 Drawing Sheets

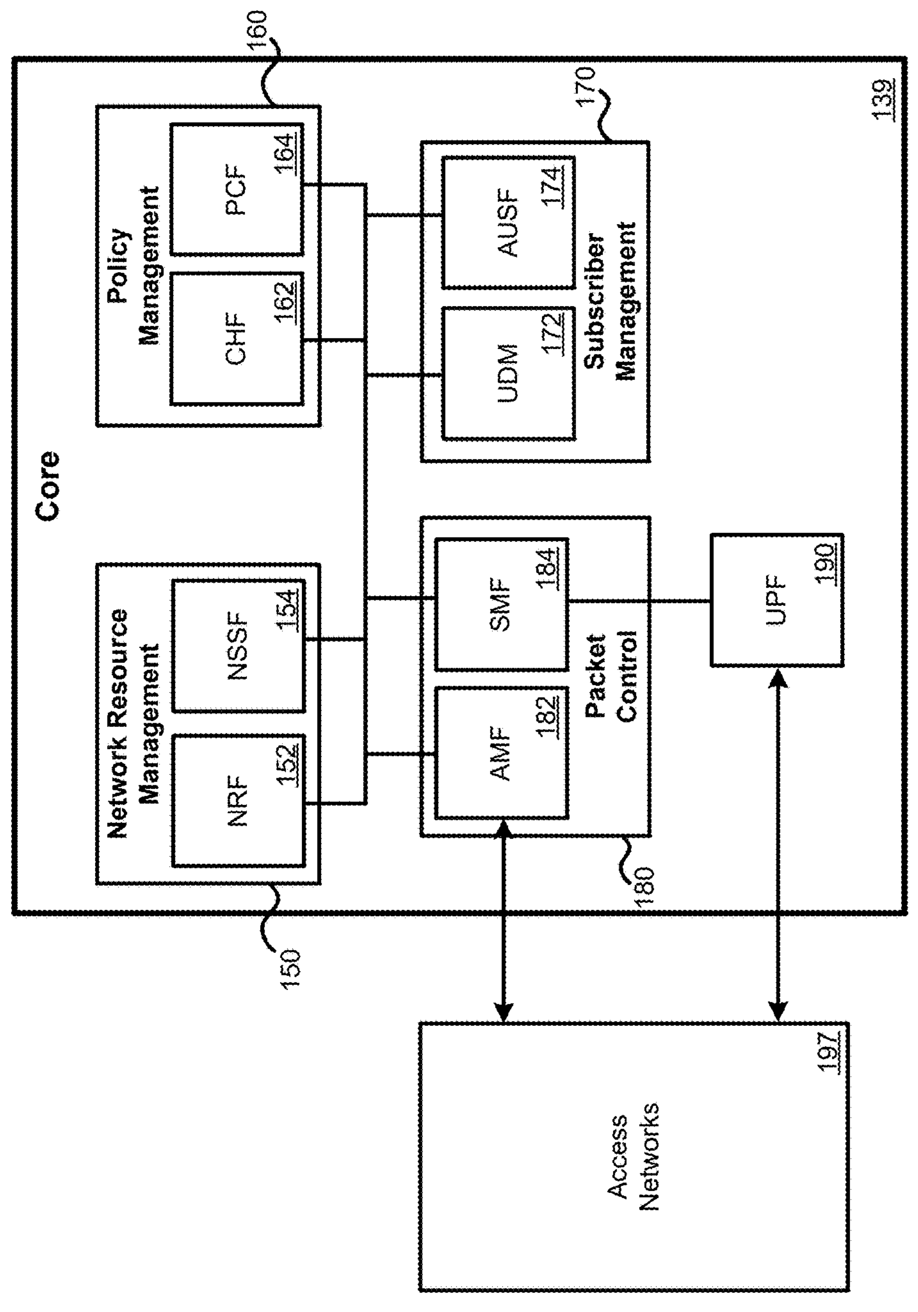
FIG. 1B

MIMO CELLULAR ANTENNA ARRAY CONFIGURATION FOR HIGH RESILIENCY AND POWER SAVINGS

BACKGROUND

Cellular communication is an energy intensive process. Advancements in cellular communication allow for superior levels of quality of wireless communication, including reliability, range, data connectivity, and high bandwidth. This includes multiple-input multiple-output (MIMO) communication, which may use antenna arrays with multiple antennas included in each array. Multiple streams of data may be transmitted simultaneously in such configurations. However, achieving these improvements quality of service requires substantial amounts of energy to be expended.

In the context MIMO cellular antenna arrays, the energy consumed to perform a particular transmission or to meet a service requirement for the network may be larger than required due to inefficient use of the antennas within an antenna array. For instance, to transmit a piece of data to a user device, it may be more energy efficient to use more antennas over a shorter period of time rather than using a fewer number of antennas over a longer period of time. In other instances, it may be useful to increase the energy usage to prioritize data to a particular user responsive to an increased service requirement (e.g., prioritized or higher speed data).

Determining how to improve energy utilization is complex and needs to be performed in real-time. Thus, there is a need for solutions to improve energy utilization or performance of cellular antenna arrays.

BRIEF SUMMARY

Aspects of the disclosed technology include a method for using a cellular antenna array. In some examples, the cellular antenna array may be a MIMO antenna array. The method also includes receiving, by an antenna optimization system of a base station, current network conditions data. The method also includes determining, by the antenna optimization system of the base station, based on the current network conditions data, an antenna configuration of an antenna array where the antenna configuration may include a defined antenna array activation pattern. The method also includes configuring, by the base station, the antenna array based on the determined antenna configuration of the antenna array. The method also includes transmitting, by the base station, cellular network data to a user device via the antenna array configured based on the determined antenna configuration of the antenna array.

Aspects of the disclosed technology include any combination of the following features. The method for using the cellular antenna array where determining the antenna configuration of the antenna array is performed using a trained machine learning model that receives the current network conditions data as input and outputs information related to the antenna configuration. The current network conditions data may include network traffic data and user demand data. The current network conditions data further may include at least one of (i) a distance of a user device to a cellular tower, (ii) a number of active user devices connected to a cellular traffic, (iii) a required bandwidth or bitrate, (iv) a required reliability metric, and (v) a channel condition. The antenna optimization system may include application specific integrated circuits to determine the antenna configuration of the antenna array. The antenna optimization system of the base station may be integrated as part of a radio unit (RU) of the base station. Antenna optimization system of the base station may be included as part of a distributed unit (DU) of the base station. Configuring the antenna array may include reducing a power output to one or more antennas within the array based on the determined antenna configuration. The method for using the cellular antenna array may include reconfiguring the antenna array periodically by antenna optimization system of the base station. The method for using the cellular antenna array may include reconfiguring the antenna array upon detecting a change in current network conditions data by antenna optimization system of the base station. Each antenna of the antenna array can be independently controlled by the antenna optimization system of the base station. The method for using the cellular antenna array may include receiving a request from a user device for a higher bitrate; and reconfiguring the antenna array based upon a request from a user device for a higher bitrate. The method for using the cellular antenna array may include reconfiguring the antenna array based upon a request from a user device for higher reliability. The method for using the cellular antenna array may include reconfiguring the antenna array based upon modified environmental conditions.

Aspects of the disclosed technology include a cellular antenna system or a MIMO antenna system. The cellular antenna system may be a cellular antenna array system. The cellular antenna system may include an antenna array which may include a plurality of individually controllable antennas. The cellular antenna system also may include an antenna optimization unit. The antenna optimization unit may be configured to receive current network conditions data; determine an antenna configuration based on the received current network conditions data, the antenna configuration configured to reduce the energy consumption by the cellular antenna system; and operate the antenna array based on the determined antenna configuration.

The cellular antenna system may include an antenna system being integrated within a base station. The antenna array is integrated within a radio unit (RU) of the base station. The antenna optimization system is included within a radio access network intelligent controller (RIC) of the base station. Current network conditions data may include at least network traffic data and user demand data.

Aspects of the disclosed technology include a non-transitory computer-readable medium storing instructions. The non-transitory computer-readable medium storing instructions, when executed by a processor may cause receiving, by an antenna optimization system of a base station, current network conditions data. The instructions may also include determining, by the antenna optimization system of the base station, based on the current network conditions data, an antenna configuration of an antenna array wherein the antenna configuration may include a defined antenna array activation pattern. The instructions may also include configuring, by the base station, the antenna array based on the determined antenna configuration of the antenna array. The instructions may also include transmitting, by the base station, cellular network data to a user device via the antenna array configured based on the determined antenna configuration of the antenna array.

BRIEF DESCRIPTION OF THE DRAWINGS

FIG. 1B illustrates an exemplary core, according to certain embodiments of the present invention.

DETAILED DESCRIPTION

Reducing energy consumption in a MIMO system may be performed by determining which antennas of a MIMO antenna array to use and the specific configuration of those antennas. Making this determination is a complex task which must be done in real-time and should consider current network data. Thus, this determination is a complex task which may not be performed solely by predetermined algorithms or methods. The disclosed technology provides solutions to make this determination.

Embodiments of the disclosed technology enable the selection or configuration of antennas within an antenna array (e.g., a MIMO antenna array) to enhance performance characteristics of a cellular network. The enhancement may be a reduction in the power consumption of the network while maintaining the same level of service. In some examples, the enhancement may allow for improved performance of the network (e.g., increased reliability or throughput) while using the same level of power or energy.

Embodiments of the disclosed technology include the use of an antenna optimization system to receive real-time data of a cellular network and to determine a configuration of antenna arrays to use to meet the demands placed on the cellular network. This configuration may include the pattern of activation or deactivation of individual antennas within the antenna array, which may be time dependent. The configuration may also include encoding or operational parameters of the antenna array (e.g., modulation and transmission schemes).

Figure 1A:
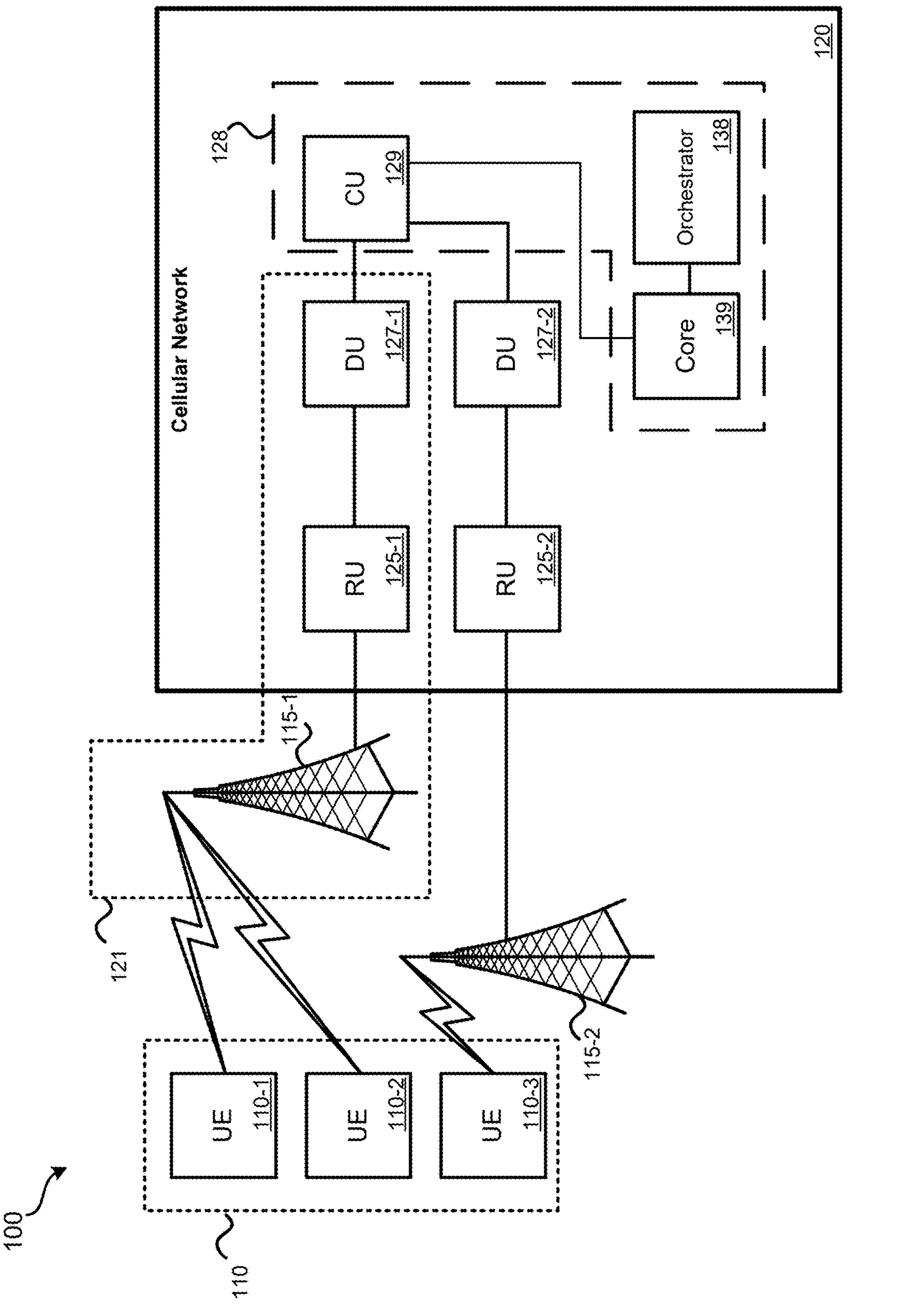
FIG. 1A illustrates an embodiment of a cellular network system, according to certain embodiments of the present invention.

Further detail regarding such embodiment and additional embodiments is provided in relation to the figures. Embodiments detailed herein can be used in various types of cellular networks, such as a 5 G New Radio (NR) cellular network. FIG. 1A illustrates an embodiment of a cellular network system 100 ("system 100"), according to certain embodiments. System 100 can include a fifth generation (5G) New Radio (NR) cellular network; other types of cellular networks, such as fourth generation (4G) long-term evolution (LTE) cellular network, sixth generation (6G) cellular network, seventh generation (7G) cellular network, etc. are also possible. System 100 can include: UE 110 (UE 110-1, UE 110-2, UE 110-3); base station 115; cellular network 120; radio units 125 ("RUs 125"); distributed units 127 ("DUs 127"); centralized unit 129 ("CU 129"); core 139, and orchestrator 138. FIG. 1A represents a component level view. In a virtualized open radio access network (O-RAN), because components can be implemented as software in the cloud, except for components that receive and transmit RF, the functionality of various components can be shifted among different servers, for which the hardware may be maintained by a separate (e.g., public) cloud-service provider, to accommodate where the functionality of such components is needed, such as detailed in relation to FIG. 2.

UE 110 can represent various types of end-user devices, such as smartphones, cellular modems, cellular-enabled computerized devices, sensor devices, manufacturing equipment, gaming devices, access points (APs), any computerized device capable of communicating via a cellular network, etc. UE can also represent any type of device that has incorporated a cellular (e.g., 5 G) interface, such as a 5 G modem. Examples include sensor devices, Internet of Things (IoT) devices, manufacturing robots; unmanned aerial (or land-based) vehicles, network-connected vehicles, environmental sensors, etc. UE 110 may use RF to communicate with various base stations of cellular network 120. Two base stations 115 (BS 115-1, 115-2) are illustrated. Real-world implementations of system 100 can include many (e.g., hundreds, thousands) base stations, and many RUs, DUs, and CUs. BS 115 can include one or more antennas that allow RUs 125 (e.g., RU 125-1 and RU 125-2) to communicate wirelessly with UEs 110. RUs 125 can represent an edge of cellular network 120 where data is transitioned to wireless communication. In some implementations, the radio access technology (RAT) used by RU 125 is 5 G New Radio (NR). Other implementations use other RAT, such as 4 G Long Term Evolution (LTE). The remainder of cellular network 120 may be based on an exclusive 5 G architecture, a hybrid 4 G/5 G architecture, a 4 G architecture, or some other cellular network architecture. Base station equipment 121 may include an RU (e.g., RU 125-1) and a DU (e.g., DU 127-1) located on site at the base station. In some embodiments, the DU may be physically remote from the RU. For instance, multiple DUs may be housed at a central location and connected to geographically distant (e.g., within a couple of kilometers) RUs.

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, "band 71" (a radiofrequency band near 600 Megahertz allocated for cellular communications). One or more DUs, such as DU 127-1, may communicate with CU 129. Collectively, RUs, DUs, and CUs create a gNodeB, which serves as the radio access network (RAN) of cellular network 120. CU 129 can communicate with core 139. The specific architecture of cellular network 120 can vary by embodiment. Edge cloud server systems outside of cellular network 120 may communicate, either directly, via the Internet, or via some other network, with components of cellular network 120. For example, one or more DUs 127-1 may be able to communicate with an edge cloud server system without routing data through CU 129 or core 139.

At a high level, the various components of a gNodeB can be understood as follows: RUs perform RF-based communication and the lower physical layer (L-PHY) with UE. DUs support lower layers of the protocol stack such as the radio link control (RLC) layer, the medium access control (MAC) layer, and the higher physical communication layer (H-PHY). CUS support higher layers of the protocol stack such as the service data adaptation protocol (SDAP) layer, the packet data convergence protocol (PDCP) layer and the radio resource control (RRC) layer. A single CU can provide service to multiple co-located or geographically distributed DUs. A single DU can communicate with multiple RUs.

Further detail regarding exemplary core 139 is provided in relation to FIG. 1B. FIG. 1B illustrates an exemplary core 139, according to certain embodiments. The exemplary core 139 can be physically distributed across data centers or located at a central national data center (NDC), such as detailed in relation to FIG. 2, or at a regional data center (RDC), can perform various core functions of the cellular network. Core 139 can include: network resource management components 150; policy management components 160; subscriber management components 170; and packet control components 180. Individual components may communicate via a bus, thus allowing various components of core 139 to communicate with each other directly. Core 139 is simplified to show some key components. Implementations can involve additional components.

Network resource management components 150 can include: Network Repository Function (NRF) 152 and Network Slice Selection Function (NSSF) 154. NRF 152 can allow 5 G network functions (NFs) to register and discover each other via a standards-based application programming interface (API). NSSF 154 can be used by AMF 182 to assist with the selection of a network slice that will serve a particular UE (e.g., UEs 110 of FIG. 1A).

Policy management components 160 can include: Charging Function (CHF) 162 and Policy Control Function (PCF) 164. CHF 162 allows charging services to be offered to authorized network functions. Converged online and offline charging can be supported. PCF 164 allows for policy control functions and the related 5 G signaling interfaces to be supported.

Subscriber management components 170 can include: Unified Data Management (UDM) 172 and Authentication Server Function (AUSF) 174. UDM 172 can allow for generation of authentication vectors, user identification handling, NF registration management, and retrieval of UE individual subscription data for slice selection. AUSF 174 performs authentication with UEs.

Packet control components 180 can include: Access and Mobility Management Function (AMF) 182 and Session Management Function (SMF) 184. AMF 182 can receive connection- and session-related information from UEs and is responsible for handling connection and mobility management tasks. SMF 184 is responsible for interacting with the decoupled data plane, creating updating and removing Protocol Data Unit (PDU) sessions, and managing session context with the User Plane Function (UPF).

User plane function (UPF) 190 can be responsible for packet routing and forwarding, packet inspection, quality of service (QOS) handling, and external PDU sessions for interconnecting with a Data Network (DN) (e.g., the Internet) or various access networks 197. Access networks 197 can include the RAN of cellular network 120 of FIG. 1A.

While FIGS. 1A and 1B illustrate various components of cellular network 120, it should be understood that other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In a virtualized arrangement, specialized software on general-purpose hardware may be used to perform the functions of components such as DU 127, CU 129, and core 139. Functionality of such components can be co-located or located at disparate physical server systems. For example, certain components of core 139 may be co-located with components of CU 129.

Returning to FIG. 1A, some O-RAN implementations of the DUs 127, CU 129, core 139, and/or orchestrator 138 are implemented virtually as software being executed by general-purpose computing equipment, such as in a data center. Therefore, depending on needs, the functionality of a DU, CU, and/or 5 G core may be implemented locally to each other and/or specific functions of any given component can be performed by physically separated server systems (e.g., at different server farms). For example, some functions of a CU may be located at a same server facility as where the DU is executed, while other functions are executed at a separate server system. In the illustrated embodiment of system 100, cloud-based cellular network components 128 include CU 129, core 139, and orchestrator 138. In some embodiments, DUs 127 may be partially or fully added to cloud-based cellular network components 128. Such cloud-based cellular network components 128 may be executed as specialized software executed by underlying general-purpose computer servers. Cloud-based cellular network components 128 may be executed on a public third-party cloud-based computing platform or a cloud-based computing platform operated by the same entity that operates the RAN. A cloud-based computing platform may have the ability to devote additional hardware resources to cloud-based cellular network components 128 or implement additional instances of such components when requested. A "public" cloud-based computing platform refers to a platform where various unrelated entities can each establish an account and separately utilize the cloud computing resources, the cloud computing platform managing segregation and privacy of each entity's data.

Kubernetes, or some other container orchestration platform, can be used to create and destroy the logical DU, CU, or 5 G core units and subunits, as needed, for the cellular network 120 to function properly. Kubernetes allows for container deployment, scaling, and management. As an example, if cellular traffic increases substantially in a region, an additional logical DU or components of a DU may be deployed in a data center near where the traffic is occurring without any new hardware being deployed; rather, processing and storage capabilities of the data center would be devoted to the needed functions. When the need for the logical DU or subcomponents of the DU no longer exists (i.e., when traffic subsequently decreases), Kubernetes can allow for removal of the logical DU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Orchestrator 138 can allow for the instantiation of new cloud-based components of cellular network 120. As an example, to instantiate a new DU, orchestrator 138 can perform a pipeline of calling the DU code from a software repository incorporated as part of, or separate from, cellular network 120; pulling corresponding configuration files (e.g., helm charts); creating Kubernetes nodes/pods; loading DU containers; configuring the DU; and activating other support functions (e.g., Prometheus, instances/connections to test tools).

A network slice functions as a virtual network operating on cellular network 120. Cellular network 120 is shared with some number of other network slices, such as hundreds or thousands of network slices. Communication bandwidth and computing resources of the underlying physical network can be reserved for individual network slices, thus allowing the individual network slices to reliably meet particular service level agreement (SLA) levels and parameters. By controlling the location and amount of computing and communication resources allocated to a network slice, the SLA attributes for UE on the network slice can be varied on different slices. A network slice can be configured to provide sufficient resources for a particular application to be properly executed and delivered (e.g., gaming services, video services, voice services, location services, sensor reporting services, data services, etc.). However, such allocations also account for resource limitations, such as to avoid allocation of an excess of resources to any particular UE group and/or application. Further, a cost may be attached to cellular slices: the greater the amount of resources dedicated, the greater the cost to the user; thus, optimization between performance and cost is desirable.

Particular network slices may only be reserved in particular geographic regions. For instance, a first set of network slices may be present at RU 125-1 and DU 127-1; and a second set of network slices, which may only partially overlap or may be wholly different from the first set, may be reserved at RU 125-2 and DU 127-2.

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

As illustrated in FIG. 1A, UE 110 may be operating on one or more production slices of cellular network 120. As detailed later in this document, a UE that functions on a particular entity's local network may be assigned to a slice particular to the entity or a slice that provides a particular Quality of Experience (QoE) for tasks to be performed by the entity's UE.

Components such as DUs 127, CU 129, orchestrator 138, and core 139 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

The capabilities of system 100 may also be described in terms of physical resource blocks (PRBs). A physical resource bock may refer to the smallest defined size of radio resource allocation which may be provided by system 100. A PRB may define how a radio spectrum is partitioned. One or more PRBs may be used for communication between a base station and a user device. A PRB may be defined over a frequency bandwidth and over a fixed specific time interval. For example, a PRB may be defined over a bandwidth (e.g., 180 kHz) over a slot of time (e.g., 1 ms). As further explained herein, PRBs may be managed through the disclosed technology to improve efficiency of energy consumption while meeting Quality of Service (QOS) requirements. The dynamic allocation of radio network resources, which may in one example be conceptualized or framed through the use of PRBs, is further discussed below. However, the disclosed technology is not limited to only formulations using PRBs but may expand to other formulations in connection with energy or cellular resources. In some examples, each PRB may also be associated with a quantum of energy.

Figure 2:
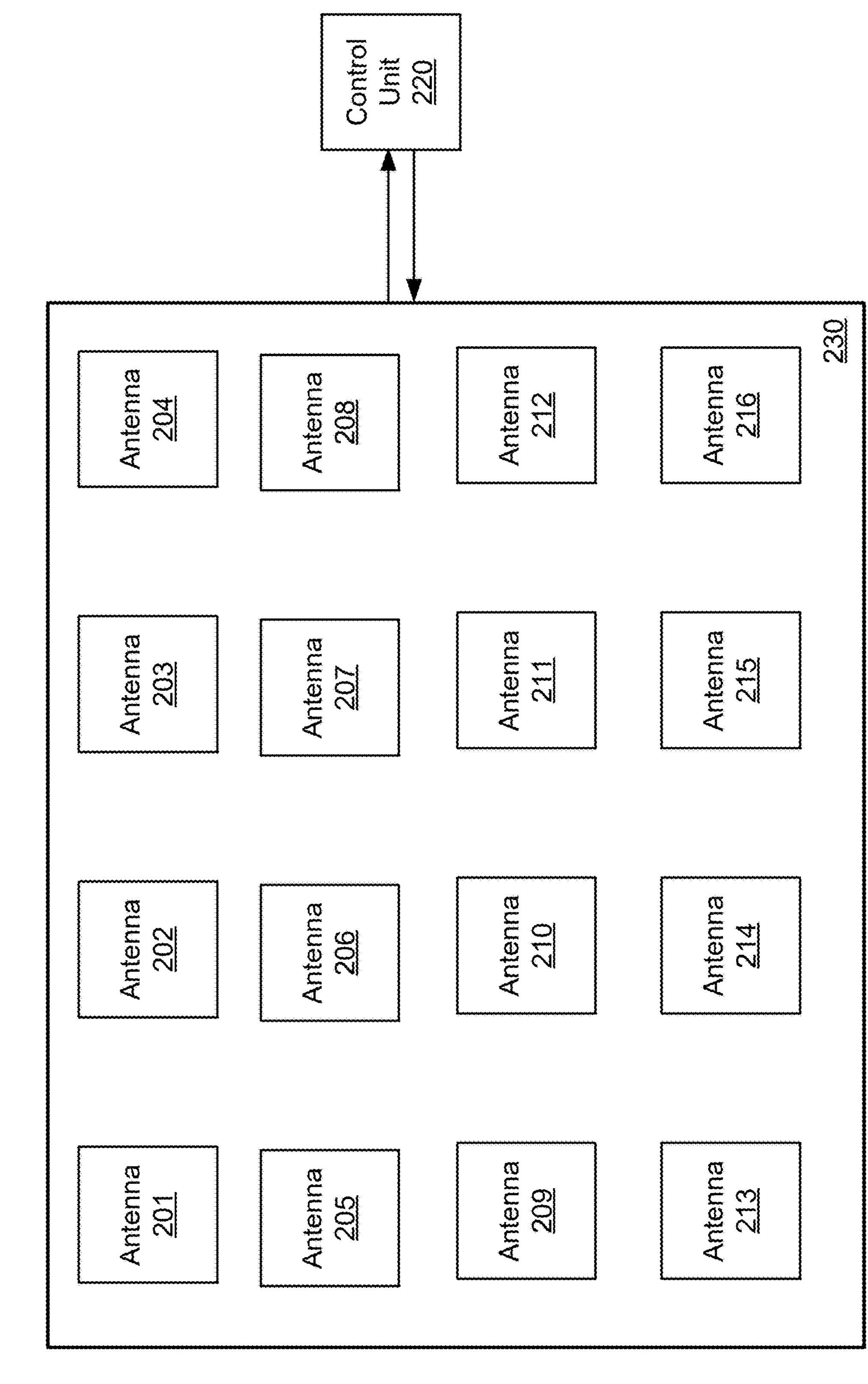
FIG. 2 illustrates an example cellular antenna array, according to certain embodiments of the present invention.

FIG. 2 illustrates cellular antenna array system 200, which contains an array 230 comprising a 4 by 4 grid of antennas. Array 230, which may be an array of antennas, illustrates 16 antennas, antennas 201-216. Other configurations of array 230 may be possible, such as arrays with a greater or fewer number of antennas. Other configurations including arrays in other geometric or spatial configurations (e.g., conical, circular, or omnidirectionally located) may also be possible. While only illustrated in two dimensions, array 230 may extend into a third spatial dimension. Each array may be designed with specific structural or functional features such as frequency ranges, impedance, bandwidth, polarization, directivity, and radiation patterns. In some examples, array 230 may be part of a base station, such as base station 115-1 or 115-2.

Array 230 may support or be compatible with various communication modes, including beamforming, multiple-input multiple-output (MIMO) communication, such as single user (SU) MIMO and multiple user (MU) MIMO. Beamforming, also referred to as spatial filtering, may be a signal processing technique used in sensor arrays for directional signal transmission or reception. SU-MIMO may be used to increase the data throughput between a single transmitter (e.g., a base station or array 200) and a single receiving device (e.g., user equipment such as a smartphone) by using multiple antennas at both the transmitter and receiver. SU-MIMO may be achieved through the use of spatial multiplexing, in which different data streams from multiple antennas of the transmitter (e.g., multiple antennas of array 230) are outputted to a single receiver containing multiple antennas. MU-MIMO extends the capabilities of MIMO technology to allow a single transmitting device to communicate with multiple receiving devices simultaneously. MU-MIMO enables one transmitter to transmit multiple data streams to several receiving devices at the same time. Beamforming is a type of RF processing in which the wireless signal is directed toward a specific direction towards specific UEs.

In the context of 5 G technology, array 230 may support massive MIMO, which may contain 32 transmit antennas, 64 transmit antennas, or even a higher number of antennas.

Each antenna of antennas 201-216 in array 230, can be independently controlled and modulated. This independent control includes the ability to adjust operational characteristics of each antenna, such as for example, the amplitude, phase, and power output of each antenna. The amplitude adjustment allows for the control of the strength of the signal emitted by each antenna element. Phase control enables the steering of the beam by adjusting the time at which the signal is emitted from each antenna element, thereby allowing the beam to be directed toward a specific target or area. Power control involves managing the intensity of the signal, which can be critical for managing interference and optimizing signal strength based on distance and other environmental factors. In some examples, a set of antennas may be used for transmitting in a particular direction and a set of antennas for transmitting in a particular direction. For example, 8 antennas may be transmitting antennas while 8 antennas may be receiving antennas. This configuration may be referred to as an "8 by 8" configuration.

Antennas of array 230 may be designed according to use case requirements. For example, dipole antennas, patch antennas, or horn antennas may be used. These variations in antenna design or choice may offer different characteristics in terms of transmission patterns, frequency response, and power consumption. Additionally, each antenna may be formed from materials which can affect the operational frequency range of each antenna.

Although not illustrated, array 230 or elements thereof, may contain additional electronic components, such as low-noise amplifiers, phase shifters, or power amplifiers, which may be used to modulate and tune the signals which are transmitted or received by each antenna element.

Each antenna may also contain additional capabilities with respect to polarization control. Support of different polarization modes (e.g., a linear, circular, or elliptical polarization) may allow for increased link reliability under varying propagation conditions and for use in MIMO communications.

Antenna array 230 may be in communication with one or more hardware or software control units, such as for example, control unit 220. Control unit 220 may be in communication with or a part of one or more units described above with respect to FIGS. 1A and 1B (e.g., radio units, distributed units, or centralized units). For example, control unit 220 may be part of a component or unit which converts digital data to analog information, such as RU 125. This analog information may in turn be transmitted to or through other components to control the operation of antenna array 230. In another example, control unit 220 may be entirely digital and part of a component or unit which only provides digital instructions, such as a DU 127. In this example, control unit 220 may provide digital instructions which are converted to physical instructions (e.g., analog signals) to control the physical hardware of antenna array 230. Control unit 220 may be contain a combination of hardware (e.g., processors, RAM, cache, memory) and software to control one or more of the antennas 201-216. In some examples, control unit 220 may be an application-specific integrated circuit (ASIC). Control unit 220 may provide functionality such as beamforming, signal adjustment, adaptive control, communication protocol management, and network coordination. Communication between the antennas in array 230 and the control units 220 may occur through a wired connection with low latency. This communication may allow for real-time data transfer about the antenna's performance and the environmental conditions, which the control unit 220 may use to adjust certain aspects of array 230.

Beamforming may refer to a signal processing technique which is used to direct the transmission or reception of signals in specific directions. Beamforming may be achieved by manipulating the phase and amplitude of the signal at one or more of the antennas to create constructive and destructive interference in desired directions. Signal adjustment may refer to adjusting an antenna's signal individually through adjustment in terms of amplitude, phase, or power of the signal. In some examples, a group of antennas can be adjusted in concert. Adaptive control may refer to the use of changing beam patterns based on environmental changes, changes in transmission conditions, or movement of a target (e.g., a user device) to maintain signal integrity, transmission speeds, or other criteria.

In examples where arrays may be integrated into larger systems, such as systems described above with respect to FIGS. 1A and 1B, one or more control units can assist in communication between multiple arrays to coordinate with other network elements to ensure seamless communication for the entire network. This may include tasks like scheduling, resource allocation, and interfacing with other network infrastructure. These one or more control units may be controlled or orchestrated by elements described above with respect to FIGS. 1A and 1B.

As further explained below, at a physical level, when determining which one of the one or more antennas to use to fulfill a certain cellular request or task (e.g., transmission of data to user equipment), various aspects, including the physical structure of antennas (e.g., size, make, model, type), the current conditions, demands on the network, and the resources currently being used may be considered. For example, the use of more antennas for a shorter period of time may be more efficient than using fewer antennas for a longer period of time to meet a certain transmission request which the network is fulfilling.

Figure 3:
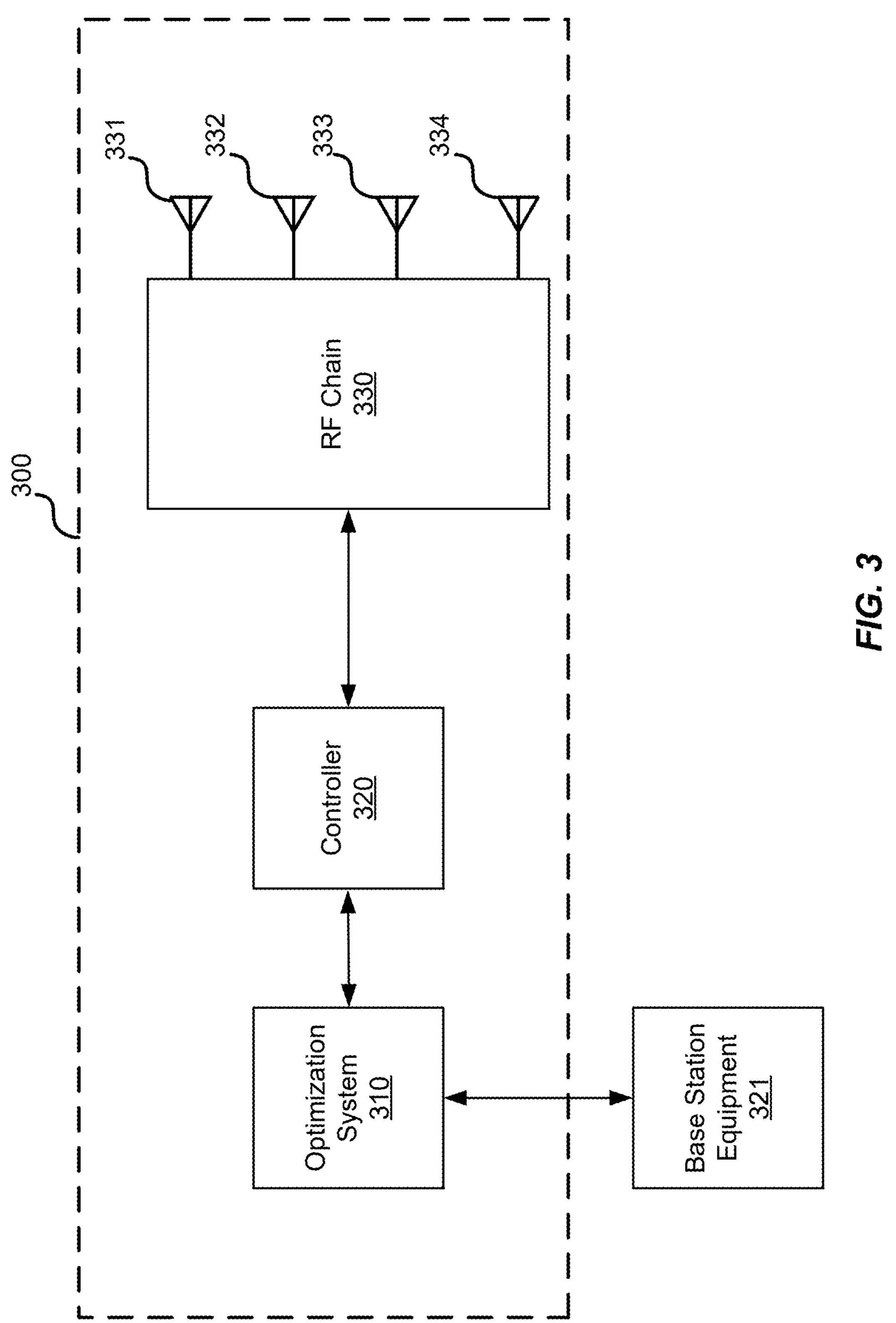
FIG. 3 illustrates an exemplary architecture related to traffic routing according to embodiments of the present invention of the present invention.

FIG. 3 illustrates an example architecture according to embodiments of the disclosed technology. Architecture 300 may be a portion of a cellular antenna system and/or a cellular antenna array system. FIG. 3 illustrates architecture 300 which may include an optimization system 310 which may be in communication with a controller 320. Controller 320 may be a controller for a multiple-antenna system, such as for example, an antenna array or combination of multiple antenna arrays. Controller 320 may in turn be in communication with an RF chain 330, which may comprise multiple individual arrays, antennas, or communication elements (e.g., transmitters and/or receivers). As illustrated in FIG. 3, RF chain 330 may be an array which may comprise antennas 331, 332, 333, and 334. RF chain 330 may also contain additional circuitry or electronic components (e.g., filters, amplifiers, mixers, attenuators, detectors) which may be used in connection with antennas 331-334. Architecture 300 may also be used in other RF communication systems where energy efficiency is desired or critical, such as in satellite communication systems, battery powered base stations, base stations running on backup or emergency power (e.g., a generator with a maximum power output), or base stations in remote areas. Architecture 300 may be in communication with base station equipment 121 or be part of base station equipment 121. For example, components of architecture 300 may be part of RU 125 or DU 127. In some examples, optimization system 310 may be part of DU 127, and include use digital information to determine a configuration of an antenna array, while controller 320 may be part of RU 125 and convert digital information to analog information. The determined configuration, which may be digitally represented, may be sent to controller 320. Controller 320 may take this digital information and translate the information received from optimization system 310 (e.g., high level instructions on antenna configuration) into more specific information which may be used to control an antenna. For example, optimization system may transmit a vector or message representing antenna numbers and times for activation, and controller 320 may convert these into specific instruction sets. In some examples, controller 320 may also perform a conversion from digital instructions to analog instructions, which may be provided to RF chain 330. In such examples, controller 320 may be part of RU 125. In some examples, optimization system may be part of a RAN Intelligent Controller (RIC) or a Radio Intelligent Controller. The RIC or controller 320 may also be distributed or be in part on DU 127 and RU 125.

The control of RF chain 330, or components thereof, by optimization system 310 may allow for a dynamic system that can adjust in real time to network demands and user requirements while still allowing to conserve energy, and simultaneously providing an adequate level of service, meeting a QoS requirement, or a QoE requirement. This could be particularly important in scenarios where energy consumption is a critical concern, such as in remote or battery-powered base stations.

Optimization system 310 may contain processors and memory which are configured to perform operations to improve energy use or performance of the system. Optimization system 310 may make decisions based on information including a number of user devices connected or in communication with a specific array or group of related arrays (e.g., arrays on one cellular tower servicing one area), a required or requested QoS, the overall cellular traffic load (e.g., in bits per second or other metric), and the number of radio channels available between all user devices.

In more detail, a QoE requirement can relate to one or more indicators that may affect a user's perception of his or her experience with using the network. QoE may include measures such as latency, jitter, packet loss, buffering time for content, dropped calls, dead time, etc. A QoE requirement may be based on the type of data which is being transmitted to a user equipment. Based on this information, a minimum number of antennas or minimal overall transmission power can be determined. For example, the minimum number of antennas may be a multiple of the average bitrate required for a particular cellular activity (e.g., transmitting a video at a certain quality rate) can be maintained.

The number of antennas may define the capacity of radio links between a UE and the array (or network). The capacity of these links can impact the QoE delivered to a UE. The larger number of antennas will result in the higher capacity to a UE and a higer delivered QoE but with a larger energy consumption.

This trade off can be resolved by adjusting the number of antennas appropriately to deliver the acceptable QoE while reducing the energy consumption. This may include determining the minimum acceptable QoE, the minimum capacity to deliver this QoE, and in turn, the number of antennas and the configuration of those antennas to provide this capacity. The number of connected UEs to an antenna array will affect the required capacity for that array. "Time," "frequency," and "space" may be considered factors which affect the capacity of a cellular array, and increasing the use of multiple antennas increases the "space" that a network has.

Optimization system 310 may ensure power can be maintained to ensure that a minimum level of QoE is always maintained. This may include, for example, the use of beamforming with multiple antennas, or always including a redundant or secondary antenna with an energy level based on the required QoE for a device. Similarly, the number of user devices connected to an antenna may affect the required capacity. For example, for a higher number of user devices, a higher number of antennas may be provisioned since the higher number of user devices may require more capacity that can be provided using more number of antennas. For a lower number of user devices or user devices requiring a lower QoE, a lower number of antennas may be provisioned. The fewer number of antennas will result in few transmit power. As the number of user devices connected to an antenna array changes, the antenna configuration may also be updated or changed by optimization system 310. Optimization system 310 may also determine that certain "spikes" in user requests, e.g., a large download from a specific user device, can be satisfied by using additional energy and/or an additional antenna. Similarly, overall traffic load of the system can be used by optimization system 310 to ensure that the array is not underpowered, and that a minimum number of antennas within the array are always available and active. These determinations may be made using a trained machine learning model, such as those further described below with respect to FIGS. 4 and 5.

In some examples, optimization system 310 may consist of specialized circuitry or hardware configured to run specialized algorithms, including machine learning models, efficiently. For example, optimization system 310 may contain one or more ASICs which are configured to run trained machine learning models. The design on the ASIC may be based on the type of machine learning model used, type of data being processed, other algorithms being used, or other considerations such as latency or instruction set to be provided to the antennas.

Optimization system 310 may make determinations based on the inputted data to determine the number of antennas which should be active to improve power consumption of the system. Additionally, it may decide which subset of available antennas from the system may be active at a specific time based on their location, relative location, physical characteristics, model, energy consumption, hysteresis effect, total capability, expected reliability of a link or connection, temperature, weather, a new or updated QoS request received by the network, QoE information received by the network, historical density of cell traffic in an area, type or classification of cellular area (e.g., rural, urban, suburban), time of day (e.g., day, night), average distance to user devices, peak traffic request, average latency, irradiation, daily interference patterns, precipitation, etc. Optimization system 310 may use multiple algorithms to these determinations, including for example, predictive modeling, time series modeling, heuristics, and machine learning algorithms to make these changes. Additionally, optimization system 310 may also receive feedback information with respect to QoS metrics to ensure that changes it makes do not impact the QoS to a metric which is beyond the expected performance characteristics. Optimization system 310 may also calculate a cost for the power being used by receiving real-time information about energy prices (e.g., a spike in prices during peak hours) to optimize to reduce cost and not solely reduce energy. For example, optimization system 310 may be configured to keep energy costs under a certain amount as a constraint during its optimization decisions.

Optimization system 310 may achieve the improved energy consumption by switching off certain antennas in an array, changing the set of active antennas, choosing subsets of antennas for varying functions, dynamically increasing or decreasing the power level of a subset of antennas, or changing modulation or other communication parameters to improve the overall energy consumption. Optimization system 310 may choose a subset of "n" antennas based on the physical distance between the "n" antennas as the physical distance between antennas may affect RF properties of the transmission. Optimization system 310 may also be configured to reduce the energy consumption at a given unit of time (e.g., a 10 minute period or during a three hour window) or reduce the overall energy consumption of a specific tower or antenna array over a longer period (e.g., a week or a month). Optimization system 310 may also output an instruction set on which antennas should be activated, when and how they should be used (e.g., reducing power to certain antennas once a specific transmission is completed), and how the antennas may be configured or used (e.g., a specific mode of transmission, a specific encoding, or using a set of antennas for a specific user device alone). In some examples, these instructions may be referred to as an antenna array activation pattern or an antenna array control pattern. Optimization system 310 may also dynamically adapt the number of active antenna elements (e.g., antenna ports or physical antenna elements) to reduce the transmit power and enhance network energy efficiency. As another example, optimization system 310 may switch between higher order massive MIMO and a lower order massive MIMO.

Optimization system 310 may use optimization algorithms to improve the energy efficiency of the system. The optimization system 310 may approximate an optimal solution which is an improvement over the existing energy use and need not provide a solution which is a global minimum. Gradient-based optimization algorithms may include gradient descent, stochastic gradient descent (SGD), Adagrad, and RMSprop, which mainly rely on derivatives to minimize or maximize a function. Evolutionary algorithms such as a genetic algorithm, differential evolution, and particle swarm optimization (PSO) may simulate natural processes and behaviors to solve optimization problems. Derivative-free optimization techniques, including the Nelder-Mead Simplex Algorithm and CMA-ES (Covariance Matrix Adaptation Evolution Strategy), are used when derivatives or other functions are not available. Linear and quadratic Programming approaches like the simplex algorithm and interior point methods focus on problems defined by linear relationships. Constrained optimization methods such as Sequential Quadratic Programming (SQP) and Augmented Lagrangian Methods are designed for problems with constraints. Other algorithms may include conjugate gradient. A combination of algorithms may be used for various stages of an optimization problem by optimization system 310. Each algorithm may be chosen based on factors like problem constraints, objective function nature, and computational efficiency requirements.

Optimization system 310 may provide instructions to modulate or control antenna via controller 320, RF chain 330, and in turn to antennas 331-334. These instructions may control the operation of antennas 331-334.

Figure 4:
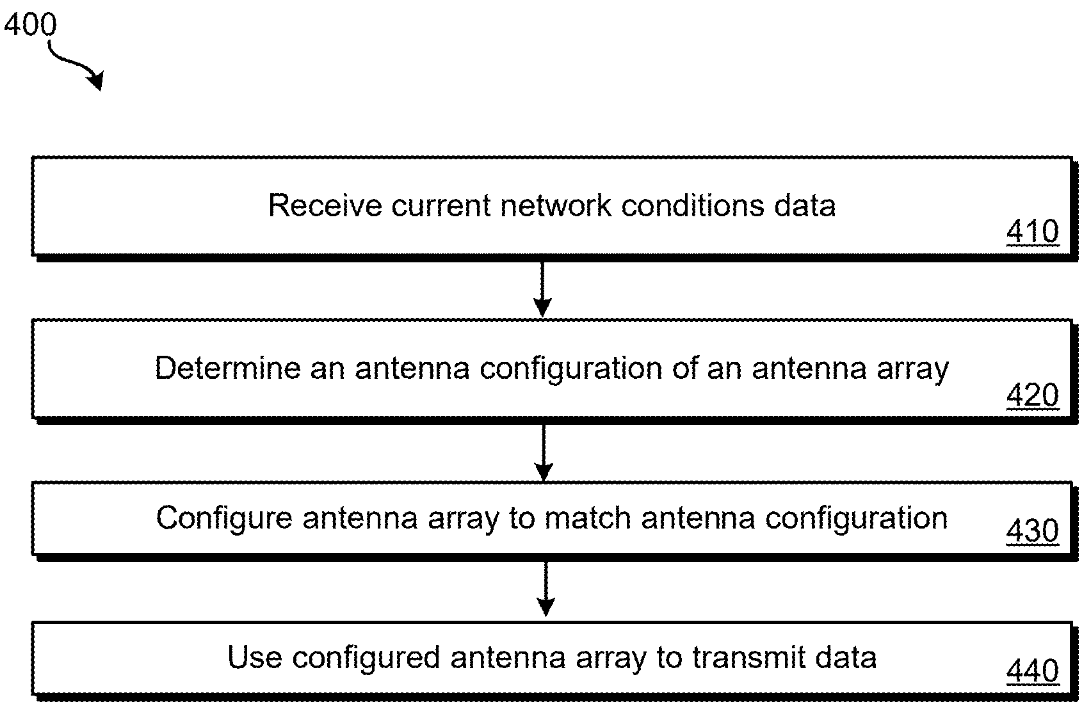
FIG. 4 illustrates an example method according to embodiments of the present invention.

FIG. 4 illustrates a method 400 according to aspects of the disclosed technology.

Method 400 may be used to control or configure an antenna array capable of MIMO communication. Method 400 may additionally use information known with respect to an antenna array, such as, for example, those described above with respect to FIG. 3. As further explained below, method 400 may allow for a dynamic adaption of the number of active antenna elements (antenna ports or physical antenna elements) to reduce the transmit power of the network and enhance network energy efficiency.

At process block 410, an antenna optimization system, such as optimization system 310, of a base station may receive current network conditions data. In some examples, the antenna optimization system may be integrated as part of a radio unit (RU) of a base station. In some examples, the antenna optimization system may be implemented in a RIC. In some examples, the antenna optimization system may be integrated as part of a distributed unit (DU) of a base station. Each antenna of an antenna array may be independently controlled by the antenna optimization system of the base station.

In some examples, an iterative process may be used. The iterative process may include obtaining a required bitrate or capacity for a UE. This may be based on QoE or other factors. Based on the information obtained, for a particular number of antennas, an arrangement or configuration which provides the largest capacity for the particular number of antennas can be obtained. If the capacity meets the requirements (e.g., required bitrates), the process may be considered complete. Otherwise, the particular number of antennas can be iterated higher and the process can be repeated until the capacity is met.

In non-iterative examples, a neural network (or other machine learning model) can predict the optimal number of antenna elements. A separate neural network (or other machine learning model) can obtain the optimal arrangement for the number of antenna elements for the optimal bitrate (e.g., a bitrate which is closest to the requirements based on the UE).

The antenna optimization system of a base station may include decision making and analysis capabilities, including trained machine learning models, classifiers, and time-series based analyzers to determine operational configurations of antennas within an antenna array, including their mode, energy levels, activation/deactivation of antennas, or modulation.

In some examples, current network conditions data may include a distance of user equipment or a user device to a cellular tower, a number of active user devices connected to a cellular traffic, a required bandwidth or bitrate, a minimal QoS or QoE, and a required reliability metric. In some examples, current network conditions data may include any of the following non-limiting examples types of information: overall bitrate, bitrate for a particular user equipment connected to an array, signal-to-noise ratio (e.g., quality of received signal compared to background noise); network traffic types (e.g., data types like video, audio, text); bandwidth utilization (e.g., amount of bandwidth used versus total available); handover rate (e.g., frequency at which devices switch from one cell tower to another); device density (e.g., number of devices per unit area); service type demands (e.g., demand for different services like voice and data); spectral efficiency (e.g., how well the allocated spectrum is utilized); channel occupancy (e.g., percentage of time a frequency channel is used); error vector magnitude (e.g., measure of deviation from ideal signal); battery levels of connected devices; uplink/downlink traffic asymmetry (e.g., ratio of uplink to downlink traffic); user behavior patterns (e.g., predicting usage spikes, such as streaming times); access technology distribution (e.g., use of different technologies like 3 G, 4 G, 5 G); roaming users (e.g., number of users roaming from different networks); backhaul status (e.g., status of the connections impacting network performance); radio frequency environment (e.g., including non-cellular signals causing interference); quality of service metrics (e.g., real-time feedback on jitter, speed, or packet loss); encryption and security levels (e.g., status of security protocols); fading characteristics (e.g., variation in signal attenuation); availability of auxiliary services (e.g., status of services supporting the network, like GPS); and weather (e.g., temperature, precipitation, and humidity).

At process block 420, the antenna optimization system of the base station may, based on current network conditions data, determine an antenna configuration of an antenna array. Block 420 may involve the use of a machine learning model which is trained to determine an antenna configuration. Additional details of the training of such machine learning models are further provided herein with reference to FIG. 5. The machine learning model may take as an input information from the current network conditions data and provide as an output an antenna configuration of an antenna array. The machine learning model may also provide a period of time for which that configuration is to be maintained prior to updating the antenna configuration. This updating process may occur based on a fixed timescale, responsive to a threshold change in the current network conditions data, or be based on the last output of the machine learning model. The antenna configuration may comprise a defined antenna array size, including for example, the specific antennas which are to be activated or deactivated. In other examples, the antenna configuration can include time series information about a pattern of activation or deactivation of antennas. The antenna configuration may also comprise an antenna array activation pattern. The antenna array activation pattern may be a pattern from a set of available patterns, which may comprise which antennas of the available antennas should be energized and used for a cellular transmission. The antenna activation pattern may also specify using certain antennas for a single transmission (e.g., providing a high level of data to one user device), while using other antennas for another transmission (e.g., providing high reliability to a different user device, such as a drone, which requires high reliability due to the nature of task). The antenna activation pattern may also be adjusted based on information or requests from user devices, such as a request to increase bandwidth. For example, upon detecting a certain element in a video feed, a drone may make a request for a higher bandwidth to transmit a higher quality live video. In this example, the antenna optimization system may take this request and reconfigure the operation of the antennas through changing or updating an antenna array activation pattern to address the request while still maintaining other cellular connections at a reduced energy consumption. If a request from the drone or other user device is a "premium" request, which authorizes a higher cost or energy consumption, the antenna activation pattern may be configured to provide the highest possible QoS to the device even at the cost of higher energy. Thus, the antenna optimization system may optimize not just for energy but for reliability, bandwidth, or other parameters.

At process block 430, the antenna array may be configured by the base station based on the determined antenna configuration. This may be done at the base station or any components thereof. In some examples, this may be performed through or via components which are located closer to the antennas to reduce latency. Configuration may also include deactivating one or more antennas within the array based on the determined antenna configuration.

At process block 440, cellular network data may be transmitted to a user device through the configured array. The configured array may differ from a previous configuration or activation pattern of a cellular array to enhance efficiency, improve QoS, or reduce the energy consumption of a particular tower.

In some examples, the antenna array may be reconfigured periodically. In other examples, upon a threshold change within one or more information of the current network conditions data, an antenna optimization system may reconfigure the antenna array. reconfiguring the antenna array based upon a request from a user device for a higher bitrate, higher reliability, or based on receiving an alert or message for modified environmental conditions (e.g., background RF noise, weather, density of devices, humidity).

Figure 5:
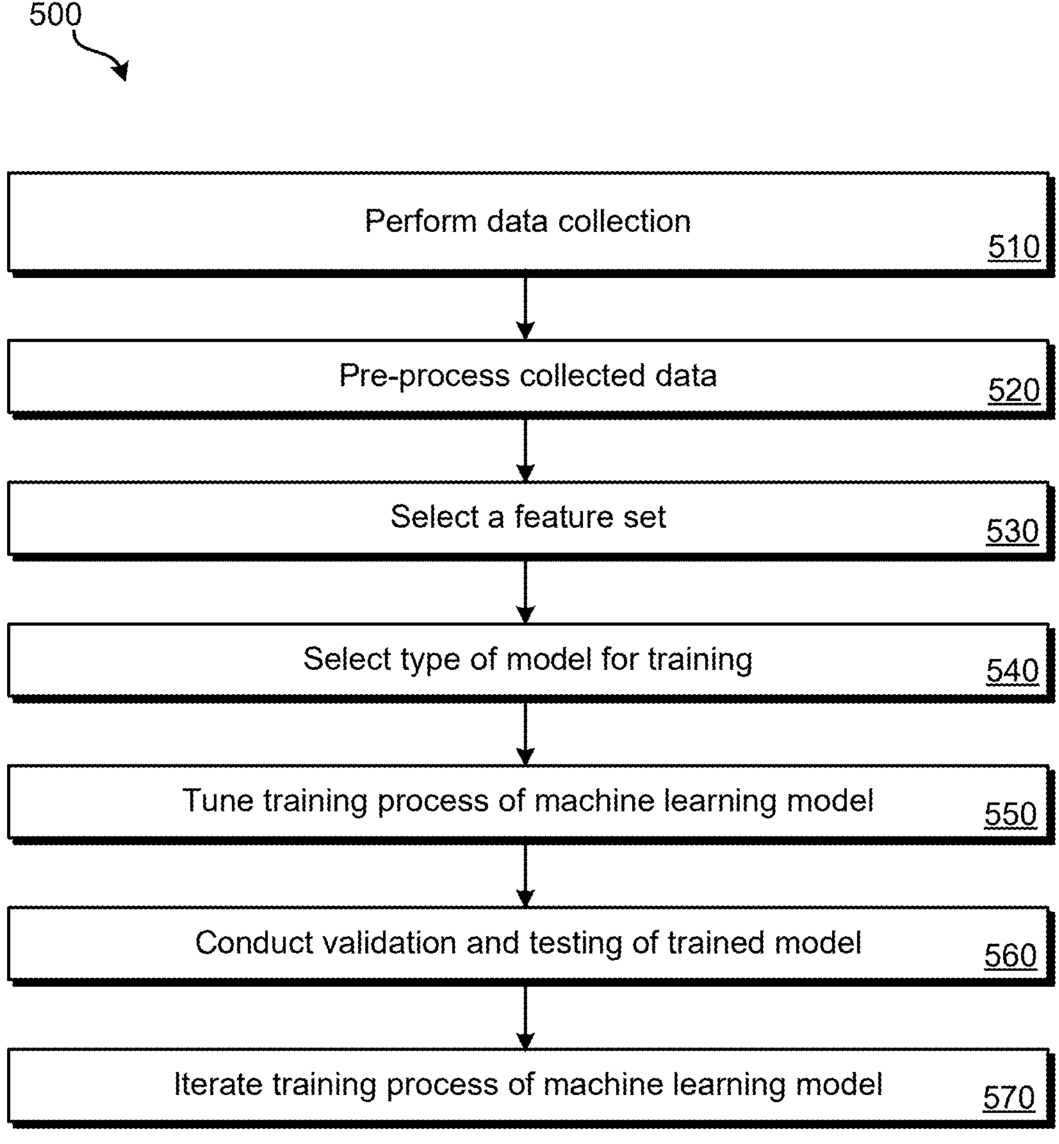
FIG. 5 illustrates an example method according to embodiments of the present invention.

FIG. 5 illustrates an example method 500 according to aspects of the disclosed technology. Method 500 may be used to train a machine learning (ML) model for use in an optimization system 310. Once trained, the trained machine learning model may be used at process block 420 references above with respect to FIG. 4. In some examples, the trained machine learning model may be updated over time and provided to optimization system 310.

Prior to discussion of method 500, an overview of a machine learning process, including inputs and outputs given to a machine learning model, is provided.

In broad overview, the machine learning process model may include providing a set of training data tagged with ground truth data. The set of training data may include one or more features described herein with respect to current network conditions data. The ground truth for the current network conditions data may be an antenna configuration which minimizes or reduces the energy consumption for the specified current network conditions data. For example, for an array element with 64 antenna elements, the current network conditions may indicate that 12 user devices are being served for voice data and 4 user devices are being served for video streaming, for a total of 16 devices. The current temperature, time of day, bitrate, temperature of the antennas, and other data related to the current network conditions may be included in the input data. The ground truth provided for this set of information may be a configuration which activates antenna numbered or referenced by 16, 20, 24, and 28. The specific power to be provided to antennas 16, 20, 24, and 28 may also be included in the ground truth. Finally, the time based length for this configuration may also be included in the ground truth. Determination of the ground truth in this example may be based on a separate modeling process (e.g., using physics based RF modeling software), expert annotation of the data, an iterative search over all possible combinations of antennas, or collection of empirical data through physically simulating the conditions for an antenna array and checking various antenna configurations. Other training data instances may be provided, (e.g., 4 user devices, 8 user devices, or 32 user devices in communication with the array) and the ground truth or expected value for each of data instances.

As another example, channel information can be collected based on UE channel state information (CSI) feedback. CSI information may contain information which can describe how a signal propagates from the transmitter to the receiver and may represent the combined effect of, for example, scattering, fading, and power decay with distance. A machine learning model may use the CSI feedback from a UE, the required capacity of the network, and other characteristics described herein as inputs. If the CSI feedback contains channel information from all the antenna elements of an antenna array, an optimization algorithm, or a machine learning model, may perform a search to select for an optimal (or improved) group of the antenna elements which can provide the same capacity, same level of QoE, QoS, or a combination of the same. This selection of antennas along with the input data (which may include CSI information) can be used to train a machine learning model. In some examples, if the CSI feedback does not have channel information from all antennas elements in the antenna array, interpolative or predictive techniques of a channel for all the antennas arrays may be used to estimate an optimal antenna configuration, which may be used for training purposes or for configuring antenna arrays.

In some examples, a neural network with 3 nodes in an output layer may be included, such as for example, a node representing an antenna configuration, a node representing the power to each antenna, and a node representing the time the configuration should be active.

In another example, such as for training based on classifications, a set of training data may be tagged with a ground truth which is an integer which represents a class of current network conditions. Any number of classes may be possible. Each class may be associated with a type of antenna configuration to be used for that class. In this example, the set of training data may be used to train a classifier type of machine learning model. Increasing the number of classes may provide for a larger number of antenna configurations. In some examples, two classifiers may be used trained for simultaneous use. For example, one classifier may be used to determine which antennas to use, and a second classifier may be used to determine the mode of transmission.

Training of the machine learning model may take place through providing hundreds, thousands, or even millions of such data points to improve the predictive ability of the machine learning model. In some examples, the training may take place through epochs. The machine learning and training process may include any of the following features or methods for training. In some examples, supervised learning models may be used. In this example, models may be trained on a labeled dataset. For instance, each training example for the machine learning model may be paired with an output label. In the training process, the model learns to predict an output from an input set of data.

Supervised examples may include linear regression for continuous outputs and logistic regression, support vector machines (SVMs), and neural networks for categorical outputs. A supervised learning algorithm takes a known set of input data and known responses to the data (output) and trains a model to generate reasonable predictions for the response to new data. Classification techniques may be used here to take input data and classify the input data to a specific output. Classification may include classifying input data to provide a specific output which is a configuration of active antennas. Regression techniques may be used for outputs which are described as continuous rather than in a class, such as amperage, power, current, or transmission rate. Regression may be used to assign a power to a specific antenna.

Additional examples may include unsupervised learning models. Such models work with unlabeled data. Techniques which may be used include clustering (e.g., k-means, hierarchical clustering) and dimensionality reduction (e.g., principal component analysis, auto-encoders, etc.). In these examples, a model attempts to find hidden patterns or intrinsic structures in data. It is used to draw inferences from datasets consisting of input data without labeled responses. In these examples, input data can be provided and a model may attempt to draw patterns on the type of data or other features intrinsic to the data. For example, for a set of current network condition data which is provided, unsupervised learning may attempt to discover a pattern, such as a correlation between user equipment density and type of data requested. These correlations may be used to determine how to configure an antenna array.

Other examples may include semi-supervised learning processes. This involves a combination of a small amount of labeled data and a large amount of unlabeled data. The model leverages the labeled data to learn better representations of the unlabeled data, improving its performance. The unlabeled data may be later labeled for additional training or testing of the performance of the model.

In some examples, reinforcement learning techniques may be used. In some examples, models may be trained or "learn" to make sequences of decisions by interacting with an environment to achieve a goal. The learning is guided by rewards, where the model seeks to maximize its total reward. In such training examples, for a set of input data (e.g., current network conditions), the model may be trained to make changes or attempt antenna configurations which maximize energy savings while still maintaining a required QoE. Additionally, in such examples, a penalty to the goal may be created in the training process when a QoE is not met. This may ensure that the training process does not learn or provide solutions which are extremely low in energy but do not provide usable antenna configurations (e.g., one antenna at a low energy but a very high transmission time).

In some examples, additional types of machine learning models, techniques, or training methods may be used. In some examples, a Recurrent Neural Network (RNN) may be used. A Recurrent Neural Network (RNN) is a class of artificial neural networks where connections between nodes form a directed graph along a temporal sequence. This structure allows RNNs to exhibit temporal dynamic behavior and to process sequences of inputs. This makes them particularly suitable for applications where the time aspect of data is useful. For example, as there is a time component to energy expenditure and the pattern of array activation, the RNN may be useful. RNN architecture involves a layer of neurons that are connected in a loop, allowing information to persist. Variants of the RNN network, including Long Short-Term Memory (LSTM) may be used. LSTM is designed to overcome a problem of a vanishing gradient in RNNs and is capable of achieving learning long-term dependencies. Gated Recurrent Units, which are a simplified version of LSTMs may also be used. GRUs use a different gating mechanism than LSTMs and are effective at capturing long-term dependencies.

At process block 510, data collection can take place to train a machine learning model. This may include any of the current network conditions data described above. In some examples, the data collection may also be associated with a specific energy usage, number of physical resource blocks (PRBs), a particular array or type of array (size, manufacturer, configuration), and modulation scheme. This information may be based on historical data or a set of training or testing data. Other types of data which may be gathered here may include historical and real-time data, such as signal-to-noise ratios, network traffic types, device density, device types, and bandwidth utilization. In some examples, the data collection may also include simulation of energy consumption patterns or the creation of synthetic data based on modeling of energy consumption or the number of PRBs used for different use cases, varying demands on the network, or based on variations in temperature, weather, or irradiance. For instance, a physics simulation software may be used to determine or simulate the energy consumptions demands on a particular type of antenna and the signal propagated by that antenna based on variations of environmental factors and network use factors.

At process block, 520, the collected data may be preprocessed. This may include normalization of the data, removing or reducing data with high correlation, or simplifying or removing certain types of data. The removal of certain types of data or simplification may be useful for the purpose of training. For example, temperature values may be simplified into ranges for simplification and efficiency of the machine learning model (e.g., in increments of 5 degrees). Simplification of certain types of data may improve performance of the machine learning model.

At process block 530, a feature set may be selected. This may include the features or set of features which are most relevant to the energy performance characteristics of the MIMO system. Any subset of features may be also selected at this block. As an example, channel occupancy and spectral efficiency may form a subset of features. In some examples, multiple feature sets may be selected for training. The feature set which is determined to be most significant may later be selected.

At process block 540, a type of model may be selected for training. This may include classification models, regression models, or neural networks. For example, a neural network may include a final layer which represents the number of antennas in an array, the first antenna element in the group of selected antenna elements, and the spacing between the two consecutive antenna element in the array. In some examples, multiple neural networks may be chosen and trained, and tested for predictive accuracy. This may include neural networks with varying numbers of intermediate layers or hidden layers. The number of nodes in each layer, including the input layer, output layer, and hidden layers may also be varied in choosing a suitable machine learning model. In some examples, the neural network may be chosen based on accuracy for a subset of training data which is thought to be most common. In some examples, iterative and non-iterative processes described above may be used to determine or generate training data for training a model. In some examples, multiple models may be selected for training. For example, a specific model may be selected and trained predict the number of antenna elements to be used, while another model may be selected and trained to determine the optimal arrangement.

At process block 550, tuning of the training process or model may take place. Tuning may include changing or adjusting hyperparameters. A hyperparameter is a parameter, such as the learning rate or choice of optimizer, which specifies details of the learning process. This may include finding the best configuration of hyperparameters which maximizes the predictive accuracy and minimizes the error on a validation dataset.

At process block 560, validation and testing may take place. This may include validating the trained model on a separate dataset which is not used to train to model to evaluate the model's performance. In the context of the antenna arrays, this may include simulating the energy outputs of the antenna arrays based on the determined configurations of the model.

At process block 570, the training process may be iterated by enhancing the training dataset. This may include providing additional data, selecting different features or parameters to train the model, selecting a new algorithm or training method, or changing features of a neural network. Additionally, the model may be monitored and retrained based on new data which is received.

In some examples, multiple models may be trained based on the physical make and model of an antenna array. As various models may differ in energy consumption and performance patterns, the use of multiple models may allow for differentiation across different antenna array types within a cellular network. The training of multiple machine learning models allows for selection of a model which best aligns with the characteristics of a physical cell site.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

What is claimed is:

1. A method for using an antenna array, the method comprising:

receiving, by an antenna optimization system of a base station, current network conditions data comprising real-time data;

determining, by the antenna optimization system of the base station, based on the current network conditions data, an antenna configuration of the antenna array configured to meet demands placed on a cellular network, wherein the configuration is determined directly based on the real-time data and comprises a defined antenna array activation pattern;

configuring, by the base station, the antenna array based on the determined antenna configuration of the antenna array.

2. The method for using the antenna array of claim 1, wherein determining the antenna configuration of the antenna array is performed using a trained machine learning model that receives the current network conditions data as input and outputs information related to the antenna configuration.

3. The method for using the antenna array of claim 1, wherein the current network conditions data comprises network traffic data and user demand data.

4. The method for using the antenna array of claim 1, wherein the current network conditions data further includes at least one of a (i) a distance of a user device to a cellular tower, (ii) a number of active user devices connected to a cellular traffic, (iii) a required bandwidth or bitrate, (iv) a required reliability metric, and (v) a channel condition.

5. The method for using the antenna array of claim 1, wherein the antenna optimization system comprises application specific integrated circuits to determine the antenna configuration of the antenna array.

6. The method for using the antenna array of claim 1, wherein the antenna optimization system of the base station is integrated as part of a radio unit (RU) of the base station.

7. The method for using the antenna array of claim 1, wherein the antenna optimization system of the base station is included as part of a distributed unit (DU) of the base station.

8. The method for using the antenna array of claim 1, wherein configuring the antenna array includes reducing a power output to one or more antennas within the antenna array based on the determined antenna configuration.

9. The method for using the antenna array of claim 1, further comprising reconfiguring the antenna array periodically by the antenna optimization system of the base station.

10. The method for using the antenna array of claim 1, further comprising reconfiguring the antenna array upon detecting a change in current network conditions data by the antenna optimization system of the base station.

11. The method for using the antenna array of claim 1, wherein each antenna of the antenna array can be independently controlled by the antenna optimization system of the base station.

12. The method for using the antenna array of claim 1, further comprising:

receiving a request from a user device for a higher bitrate; and reconfiguring the antenna array based upon a request from a user device for a higher bitrate.

13. The method for using the antenna array of claim 1, further comprising reconfiguring the antenna array based upon a request from a user device for higher reliability.

14. The method for using the antenna array of claim 1, further comprising reconfiguring the antenna array based upon modified environmental conditions.

15. A cellular antenna system, the cellular antenna system comprising:

an antenna array, the antenna array comprising a plurality of individually controllable antennas comprising real-time data; and an antenna optimization unit, the antenna optimization unit configured to:

receive current network conditions data;

determine an antenna configuration, configured to meet demands placed on a cellular network, wherein the configuration is determined directly based on the real-time data and based on the received current network conditions data, the antenna configuration configured to reduce an energy consumption by the cellular antenna system; and operate the antenna array based on the determined antenna configuration.

16. The cellular antenna system of claim 15, further comprising the cellular antenna system being integrated within a base station.

17. The cellular antenna system of claim 16, wherein the antenna array is integrated within a radio unit (RU) of the base station.

18. The cellular antenna system of claim 16, wherein the antenna optimization system is included within a Radio Access Network Intelligent Controller (RIC) of the base station.

19. The cellular antenna system of claim 15, wherein current network conditions data includes at least network traffic data and user demand data.

20. A non-transitory computer-readable medium storing instructions that, when executed by one or more processors, cause the one or more processors to perform operations comprising:

receiving, by an antenna optimization system of a base station, current network conditions data comprising real-time data;

determining, by the antenna optimization system of the base station, based on the current network conditions data, an antenna configuration of the antenna array configured to meet demands placed on a cellular network, wherein the configuration is determined directly based on the real-time data and comprises a defined antenna array activation pattern;

configuring, by the base station, the antenna array based on the determined antenna configuration of the antenna array.

* * * * *